US008248939B1

(12) United States Patent  (10) Patent No.: US 8,248,939 B1
Craft et al.  (45) Date of Patent: *Aug. 21, 2012

(54) TRANSFERRING CONTROL OF TCP CONNECTIONS BETWEEN HIERARCHY OF PROCESSING MECHANISMS

(75) Inventors: Peter K. Craft, San Francisco, CA (US); Joseph L. Gervais, Fremont, CA (US); Colin C. Sharp, Half Moon Bay, CA (US)

(73) Assignee: Alacritech, Inc., San Jose, CA (US)

( * ) Notice: Subject to any disclaimer, the term of this patent is extended or adjusted under 35 U.S.C. 154(b) by 1898 days.

This patent is subject to a terminal disclaimer.

(21) Appl. No.: 11/249,006

(22) Filed: Oct. 11, 2005

Related U.S. Application Data

(60) Provisional application No. 60/617,384, filed on Oct. 8, 2004.

(51) Int. Cl.
*G01R 31/08* (2006.01)
(52) U.S. Cl. .................. 370/235; 370/469
(58) Field of Classification Search .................. 370/469, 370/235, 395.52
See application file for complete search history.

(56) References Cited

U.S. PATENT DOCUMENTS

| | | | |
|---|---|---|---|
| 4,366,538 A | 12/1982 | Johnson et al. | 364/200 |
| 4,485,455 A | 11/1984 | Boone et al. | 364/900 |
| 4,485,460 A | 11/1984 | Stambaugh | 365/203 |
| 4,589,063 A | 5/1986 | Shah et al. | 710/8 |
| 4,700,185 A | 10/1987 | Balph et al. | 340/825.5 |
| 4,991,133 A | 2/1991 | Davis et al. | 364/900 |
| 5,056,058 A | 10/1991 | Hirata et al. | 709/230 |
| 5,058,110 A | 10/1991 | Beach et al. | 370/85.6 |
| 5,097,442 A | 3/1992 | Ward et al. | 365/78 |
| 5,129,093 A | 7/1992 | Muramatsu et al. | |
| 5,163,131 A | 11/1992 | Row et al. | 395/200 |
| 5,212,778 A | 5/1993 | Dally et al. | 395/400 |
| 5,274,768 A | 12/1993 | Traw et al. | |
| 5,280,477 A | 1/1994 | Trapp | 370/85.1 |

(Continued)

FOREIGN PATENT DOCUMENTS

WO   WO 98/19412   5/1998

(Continued)

OTHER PUBLICATIONS

Internet pages entitled "Hardware Assisted Protocol Processing", (which Eugene Feinber is working on), 1 page, printed Nov. 25, 1998.

(Continued)

*Primary Examiner* — Sai-Ming Chan
(74) *Attorney, Agent, or Firm* — Mark Lauer; Silicon Edge Law Group LLP (57) ABSTRACT

In one embodiment, a system for communicating over a network is disclosed, the system comprising: a processor running a protocol processing stack to control a TCP connection; a first offload engine that receives control of the TCP connection from the stack to perform a first task corresponding to the TCP connection; and a second offload engine that receives control of the TCP connection from the first offload engine to perform a second task corresponding to the TCP connection. For example, the first offload engine can be protocol software such as an intermediate driver that can handle tasks such as teaming and/or reassembly of out-of-order data segments. As another example, the second offload engine can be a network interface card that provides hardware that accelerates data transfer.

28 Claims, 3 Drawing Sheets

U.S. PATENT DOCUMENTS

| | | | |
|---|---|---|---|
| 5,281,963 A | 1/1994 | Ishikawa et al. | |
| 5,289,580 A | 2/1994 | Latif et al. | 395/275 |
| 5,303,344 A | 4/1994 | Yokoyama et al. | 395/200 |
| 5,412,782 A | 5/1995 | Hausman et al. | 395/250 |
| 5,418,912 A | 5/1995 | Christenson | 395/200 |
| 5,448,566 A | 9/1995 | Richter et al. | 370/94.1 |
| 5,485,455 A | 1/1996 | Dobbins et al. | |
| 5,485,460 A | 1/1996 | Schrier et al. | |
| 5,485,579 A | 1/1996 | Hitz et al. | 395/200.12 |
| 5,506,966 A | 4/1996 | Ban | 395/250 |
| 5,511,169 A | 4/1996 | Suda | 395/280 |
| 5,517,668 A | 5/1996 | Szwerinski et al. | 395/800 |
| 5,524,250 A | 6/1996 | Chesson et al. | 395/775 |
| 5,535,375 A | 7/1996 | Eshel et al. | 391/500 |
| 5,548,730 A | 8/1996 | Young et al. | 395/280 |
| 5,553,241 A | 9/1996 | Shirakihara | |
| 5,566,170 A | 10/1996 | Bakke et al. | 370/60 |
| 5,574,919 A | 11/1996 | Netravali et al. | 395/561 |
| 5,588,121 A | 12/1996 | Reddin et al. | |
| 5,590,328 A | 12/1996 | Seno et al. | 395/675 |
| 5,592,622 A | 1/1997 | Isfeld et al. | 395/200.02 |
| 5,596,574 A | 1/1997 | Perlman et al. | |
| 5,598,410 A | 1/1997 | Stone | 370/469 |
| 5,619,650 A | 4/1997 | Bach et al. | 395/200.01 |
| 5,629,933 A | 5/1997 | Delp et al. | 370/411 |
| 5,633,780 A | 5/1997 | Cronin | 361/220 |
| 5,634,099 A | 5/1997 | Andrews et al. | 395/200.07 |
| 5,634,127 A | 5/1997 | Cloud et al. | 395/680 |
| 5,642,482 A | 6/1997 | Pardillos | 395/200.2 |
| 5,664,114 A | 9/1997 | Krech, Jr. et al. | 395/200.64 |
| 5,671,355 A | 9/1997 | Collins | 395/200.2 |
| 5,678,060 A | 10/1997 | Yokoyama et al. | 709/212 |
| 5,682,534 A | 10/1997 | Kapoor et al. | 395/684 |
| 5,684,954 A | 11/1997 | Kaiserswerth et al. | |
| 5,692,130 A | 11/1997 | Shobu et al. | 395/200.12 |
| 5,699,317 A | 12/1997 | Sartore et al. | 395/230.06 |
| 5,699,350 A | 12/1997 | Kraslavsky | 370/254 |
| 5,701,434 A | 12/1997 | Nakagawa | 395/484 |
| 5,701,516 A | 12/1997 | Cheng et al. | 395/842 |
| 5,706,514 A | 1/1998 | Bonola | |
| 5,727,142 A | 3/1998 | Chen | 395/181 |
| 5,742,765 A | 4/1998 | Wong et al. | 395/200 |
| 5,749,095 A | 5/1998 | Hagersten | 711/141 |
| 5,751,715 A | 5/1998 | Chan et al. | 370/455 |
| 5,751,723 A | 5/1998 | Vanden Heuvel et al. | |
| 5,752,078 A | 5/1998 | Delp et al. | 395/827 |
| 5,758,084 A | 5/1998 | Silverstein et al. | 395/200.58 |
| 5,758,089 A | 5/1998 | Gentry et al. | 395/200.64 |
| 5,758,186 A | 5/1998 | Hamilton et al. | 395/831 |
| 5,758,194 A | 5/1998 | Kuzma | 395/886 |
| 5,768,618 A | 6/1998 | Erickson et al. | 395/829 |
| 5,771,349 A | 6/1998 | Picazo, Jr. et al. | 395/188.01 |
| 5,774,660 A | 6/1998 | Brendel et al. | 395/200.31 |
| 5,778,013 A | 7/1998 | Jedwab | 714/807 |
| 5,778,419 A | 7/1998 | Hansen et al. | 711/112 |
| 5,790,804 A | 8/1998 | Osborne | 709/245 |
| 5,794,061 A | 8/1998 | Hansen et al. | 395/800.01 |
| 5,799,150 A | 8/1998 | Hamilton et al. | |
| 5,802,258 A | 9/1998 | Chen | 395/182.08 |
| 5,802,580 A | 9/1998 | McAlpine | 711/149 |
| 5,809,328 A | 9/1998 | Nogales et al. | 395/825 |
| 5,809,527 A | 9/1998 | Cooper et al. | 711/133 |
| 5,812,775 A | 9/1998 | Van Seters et al. | 395/200.43 |
| 5,815,646 A | 9/1998 | Purcell et al. | 395/163 |
| 5,819,111 A | 10/1998 | Davies et al. | |
| 5,828,835 A | 10/1998 | Isfeld et al. | 395/200.3 |
| 5,848,293 A | 12/1998 | Gentry | 395/825 |
| 5,870,394 A | 2/1999 | Oprea | |
| 5,872,919 A | 2/1999 | Wakeland | 395/200 |
| 5,878,225 A | 3/1999 | Bilansky et al. | 395/200.57 |
| 5,878,227 A | 3/1999 | Wade et al. | |
| 5,892,903 A | 4/1999 | Klaus | 395/187.01 |
| 5,898,713 A | 4/1999 | Melzer et al. | 371/53 |
| 5,913,028 A | 6/1999 | Wang et al. | 395/200.33 |
| 5,915,094 A | 6/1999 | Kouloheris et al. | |
| 5,917,828 A | 6/1999 | Thompson | |
| 5,920,566 A | 7/1999 | Hendel et al. | 370/401 |
| 5,926,642 A | 7/1999 | Favor | |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,935,249 A | 8/1999 | Stern et al. | |
| 5,937,169 A | 8/1999 | Connery et al. | 395/200.8 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,963,876 A | 10/1999 | Manssen et al. | |
| 5,970,804 A | 10/1999 | Osborne | 395/200.75 |
| 5,978,844 A | 11/1999 | Tsuchiya et al. | |
| 5,987,022 A | 11/1999 | Geiger et al. | 370/349 |
| 5,991,299 A | 11/1999 | Radogna et al. | 370/392 |
| 5,996,013 A | 11/1999 | Delp et al. | 709/226 |
| 5,996,024 A | 11/1999 | Blumenau | 709/301 |
| 6,005,849 A | 12/1999 | Roach et al. | 370/276 |
| 6,009,478 A | 12/1999 | Panner et al. | 710/5 |
| 6,014,380 A | 1/2000 | Hendel et al. | |
| 6,014,557 A | 1/2000 | Morton et al. | |
| 6,016,513 A | 1/2000 | Lowe | 709/250 |
| 6,021,446 A | 2/2000 | Gentry et al. | 709/303 |
| 6,021,507 A | 2/2000 | Chen | |
| 6,026,452 A | 2/2000 | Pitts | 710/56 |
| 6,034,963 A | 3/2000 | Minami et al. | 370/401 |
| 6,038,562 A | 3/2000 | Anjur et al. | 707/10 |
| 6,041,058 A | 3/2000 | Flanders et al. | 370/401 |
| 6,041,381 A | 3/2000 | Hoese | 710/129 |
| 6,044,438 A | 3/2000 | Olnowich | 711/130 |
| 6,047,323 A | 4/2000 | Krause | |
| 6,047,356 A | 4/2000 | Anderson et al. | 711/129 |
| 6,049,528 A | 4/2000 | Hendel et al. | 370/235 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,067,569 A | 5/2000 | Khaki et al. | 709/224 |
| 6,070,200 A | 5/2000 | Gates et al. | 710/20 |
| 6,078,564 A | 6/2000 | Lakshman et al. | |
| 6,078,733 A | 6/2000 | Osborne | 395/200.8 |
| 6,097,734 A | 8/2000 | Gotesman et al. | 370/474 |
| 6,101,555 A | 8/2000 | Goshey et al. | 709/321 |
| 6,111,673 A | 8/2000 | Chang et al. | 359/123 |
| 6,115,615 A | 9/2000 | Ota et al. | 455/553 |
| 6,122,670 A | 9/2000 | Bennett et al. | 709/236 |
| 6,141,701 A | 10/2000 | Whitney | 710/5 |
| 6,141,705 A | 10/2000 | Anand et al. | 710/15 |
| 6,145,017 A | 11/2000 | Ghaffari | 710/5 |
| 6,157,944 A | 12/2000 | Pedersen | |
| 6,157,955 A | 12/2000 | Narad et al. | 709/228 |
| 6,172,980 B1 | 1/2001 | Flanders et al. | 370/401 |
| 6,173,333 B1 | 1/2001 | Jolitz et al. | |
| 6,181,705 B1 | 1/2001 | Branstad et al. | |
| 6,202,105 B1 | 3/2001 | Gates et al. | 710/20 |
| 6,219,693 B1 | 4/2001 | Napolitano et al. | |
| 6,223,242 B1 | 4/2001 | Sheafor et al. | 710/132 |
| 6,226,680 B1 | 5/2001 | Boucher et al. | 709/230 |
| 6,233,242 B1 | 5/2001 | Mayer et al. | |
| 6,243,667 B1 | 6/2001 | Kerr et al. | |
| 6,246,683 B1 | 6/2001 | Connery et al. | 370/392 |
| 6,247,060 B1 | 6/2001 | Boucher et al. | 709/238 |
| 6,279,051 B1 | 8/2001 | Gates et al. | 710/20 |
| 6,289,023 B1 | 9/2001 | Dowling et al. | 370/419 |
| 6,298,403 B1 | 10/2001 | Suri et al. | 710/100 |
| 6,324,649 B1 | 11/2001 | Eyres et al. | 713/202 |
| 6,334,153 B2 | 12/2001 | Boucher et al. | 709/230 |
| 6,343,345 B1 | 1/2002 | Hilla et al. | |
| 6,343,360 B1 | 1/2002 | Feinleib | 713/1 |
| 6,345,301 B1 | 2/2002 | Burns et al. | 709/230 |
| 6,345,302 B1 | 2/2002 | Bennett et al. | 709/236 |
| 6,356,951 B1 | 3/2002 | Gentry et al. | 709/250 |
| 6,370,599 B1 | 4/2002 | Anand et al. | 710/15 |
| 6,385,647 B1 | 5/2002 | Willis et al. | 709/217 |
| 6,389,468 B1 | 5/2002 | Muller et al. | 709/226 |
| 6,389,479 B1 | 5/2002 | Boucher | 709/243 |
| 6,393,487 B2 | 5/2002 | Boucher et al. | 709/238 |
| 6,418,169 B1 | 7/2002 | Datari | |
| 6,421,742 B1 | 7/2002 | Tillier | 710/1 |
| 6,421,753 B1 | 7/2002 | Hoese et al. | 710/129 |
| 6,427,169 B1 | 7/2002 | Elzur | 709/224 |
| 6,427,171 B1 | 7/2002 | Craft et al. | 709/230 |

| | | | |
|---|---|---|---|
| 6,427,173 B1 | 7/2002 | Boucher et al. | 709/238 |
| 6,434,620 B1 | 8/2002 | Boucher et al. | 709/230 |
| 6,434,651 B1 | 8/2002 | Gentry, Jr. | 710/260 |
| 6,449,656 B1 | 9/2002 | Elzur et al. | 709/236 |
| 6,452,915 B1 | 9/2002 | Jorgensen | |
| 6,453,360 B1 | 9/2002 | Muller et al. | 709/250 |
| 6,453,406 B1 | 9/2002 | Sarnikowski et al. | |
| 6,470,415 B1 | 10/2002 | Starr et al. | 711/104 |
| 6,473,425 B1 | 10/2002 | Bellaton et al. | 370/392 |
| 6,480,489 B1 | 11/2002 | Muller et al. | 370/389 |
| 6,483,804 B1 | 11/2002 | Muller et al. | |
| 6,487,202 B1 | 11/2002 | Klausmeier et al. | 370/395 |
| 6,487,654 B2 | 11/2002 | Dowling | 712/244 |
| 6,490,631 B1 | 12/2002 | Teich et al. | 709/250 |
| 6,502,144 B1 | 12/2002 | Accarie | 710/8 |
| 6,523,119 B2 | 2/2003 | Pavlin et al. | 713/192 |
| 6,526,446 B1 | 2/2003 | Yang et al. | 709/230 |
| 6,542,504 B1 | 4/2003 | Mahler et al. | |
| 6,570,884 B1 | 5/2003 | Connery et al. | 370/419 |
| 6,591,302 B2 | 7/2003 | Boucher et al. | 709/230 |
| 6,591,310 B1 | 7/2003 | Johnson | 710/3 |
| 6,594,261 B1 | 7/2003 | Boura et al. | |
| 6,631,484 B1 | 10/2003 | Born | |
| 6,648,611 B2 | 11/2003 | Morse et al. | 417/310 |
| 6,650,640 B1 | 11/2003 | Muller et al. | 370/392 |
| 6,657,757 B1 | 12/2003 | Chang et al. | 359/124 |
| 6,658,480 B2 | 12/2003 | Boucher et al. | 709/239 |
| 6,678,283 B1 | 1/2004 | Teplitsky | 370/463 |
| 6,681,364 B1 | 1/2004 | Calvignac et al. | 714/776 |
| 6,683,851 B1 | 1/2004 | Wilkie et al. | |
| 6,687,758 B2 | 2/2004 | Craft et al. | 709/250 |
| 6,697,366 B1 | 2/2004 | Kim | |
| 6,697,868 B2 | 2/2004 | Craft et al. | 709/230 |
| 6,751,665 B2 | 6/2004 | Philbrick et al. | 709/224 |
| 6,757,746 B2 | 6/2004 | Boucher et al. | 709/250 |
| 6,765,901 B1 | 7/2004 | Johnson et al. | 370/352 |
| 6,807,581 B1 | 10/2004 | Starr et al. | 709/250 |
| 6,842,896 B1 | 1/2005 | Redding et al. | 717/172 |
| 6,862,264 B1 | 3/2005 | Moura et al. | |
| 6,912,522 B2 | 6/2005 | Edgar | 707/2 |
| 6,938,092 B2 | 8/2005 | Burns | 709/230 |
| 6,941,386 B2 | 9/2005 | Craft et al. | 709/250 |
| 6,965,941 B2 | 11/2005 | Boucher et al. | 709/230 |
| 6,976,148 B2 | 12/2005 | Arimilli et al. | |
| 6,996,070 B2 | 2/2006 | Starr et al. | 370/252 |
| 7,016,361 B2 | 3/2006 | Swonk et al. | |
| 7,042,898 B2 | 5/2006 | Blightman et al. | 370/463 |
| 7,047,320 B2 | 5/2006 | Arimilli et al. | |
| 7,073,196 B1 | 7/2006 | Dowd et al. | |
| 7,076,568 B2 | 7/2006 | Philbrick et al. | 709/250 |
| 7,089,326 B2 | 8/2006 | Boucher et al. | 709/242 |
| 7,093,099 B2 | 8/2006 | Bodas et al. | 711/206 |
| 7,124,205 B2 | 10/2006 | Craft et al. | 709/250 |
| 7,133,940 B2 | 11/2006 | Blightman et al. | 710/22 |
| 7,167,926 B1 | 1/2007 | Boucher et al. | 709/250 |
| 7,167,927 B2 | 1/2007 | Philbrick et al. | 709/250 |
| 7,174,393 B2 | 2/2007 | Boucher et al. | 709/250 |
| 7,181,531 B2 | 2/2007 | Pinkerton et al. | |
| 7,185,266 B2 | 2/2007 | Blightman et al. | 714/776 |
| 7,187,679 B2 | 3/2007 | Dally et al. | |
| 7,191,241 B2 | 3/2007 | Boucher et al. | 709/230 |
| 7,191,318 B2 | 3/2007 | Tripathy et al. | 712/225 |
| 7,237,036 B2 | 6/2007 | Boucher et al. | 709/245 |
| 7,254,696 B2 | 8/2007 | Mittal et al. | 712/210 |
| 7,260,518 B2 | 8/2007 | Kerr et al. | |
| 7,283,522 B2 | 10/2007 | Siddabathuni | |
| 7,284,070 B2 | 10/2007 | Boucher et al. | 709/250 |
| 7,287,092 B2 | 10/2007 | Sharp | |
| 7,337,241 B2 | 2/2008 | Boucher et al. | |
| 7,461,160 B2 | 12/2008 | Boucher et al. | |
| 7,472,156 B2 | 12/2008 | Philbrick et al. | |
| 7,496,689 B2 | 2/2009 | Sharp et al. | |
| 7,502,869 B2 | 3/2009 | Boucher et al. | |
| 7,519,699 B2 | 4/2009 | Jain et al. | |
| 7,543,087 B2 | 6/2009 | Philbrick et al. | |
| 7,584,260 B2 | 9/2009 | Craft et al. | |
| 7,620,726 B2 | 11/2009 | Craft et al. | |
| 7,627,001 B2 | 12/2009 | Craft et al. | |
| 7,627,684 B2 | 12/2009 | Boucher et al. | |
| 7,640,364 B2 | 12/2009 | Craft et al. | |
| 7,664,868 B2 | 2/2010 | Boucher et al. | |
| 7,664,883 B2 | 2/2010 | Craft et al. | |
| 7,673,072 B2 | 3/2010 | Boucher et al. | |
| 7,694,024 B2 | 4/2010 | Philbrick et al. | |
| 7,738,500 B1 | 6/2010 | Jones et al. | |
| 2001/0004354 A1 | 6/2001 | Jolitz | 370/328 |
| 2001/0013059 A1 | 8/2001 | Dawson et al. | 709/217 |
| 2001/0014892 A1 | 8/2001 | Gaither et al. | 707/200 |
| 2001/0014954 A1 | 8/2001 | Purcell et al. | 714/4 |
| 2001/0025315 A1 | 9/2001 | Jolitz | 709/231 |
| 2001/0037406 A1* | 11/2001 | Philbrick et al. | 709/250 |
| 2001/0048681 A1 | 12/2001 | Bilic et al. | 370/389 |
| 2001/0053148 A1 | 12/2001 | Bilic et al. | 370/389 |
| 2002/0073223 A1 | 6/2002 | Darnell et al. | 709/232 |
| 2002/0112085 A1* | 8/2002 | Berg | 709/250 |
| 2002/0112175 A1 | 8/2002 | Makofka et al. | 713/200 |
| 2002/0156927 A1 | 10/2002 | Boucher et al. | |
| 2003/0014544 A1 | 1/2003 | Pettey | |
| 2003/0046330 A1 | 3/2003 | Hayes | |
| 2003/0066011 A1 | 4/2003 | Oren | 714/758 |
| 2003/0067903 A1 | 4/2003 | Jorgensen | |
| 2003/0110344 A1 | 6/2003 | Szczepanek et al. | 711/100 |
| 2003/0165160 A1 | 9/2003 | Minami et al. | 370/466 |
| 2004/0010712 A1* | 1/2004 | Hui et al. | 713/201 |
| 2004/0042458 A1* | 3/2004 | Elzu | 370/394 |
| 2004/0042464 A1* | 3/2004 | Elzur et al. | 370/395.52 |
| 2004/0049580 A1 | 3/2004 | Boyd et al. | |
| 2004/0049601 A1 | 3/2004 | Boyd et al. | |
| 2004/0054814 A1 | 3/2004 | McDaniel | |
| 2004/0059926 A1 | 3/2004 | Angelo et al. | 713/168 |
| 2004/0088262 A1 | 5/2004 | Boucher et al. | |
| 2004/0153578 A1 | 8/2004 | Elzur | |
| 2004/0210795 A1 | 10/2004 | Anderson | |
| 2004/0213290 A1 | 10/2004 | Johnson et al. | 370/469 |
| 2004/0246974 A1 | 12/2004 | Gyugyi et al. | |
| 2004/0249957 A1* | 12/2004 | Ekis et al. | 709/228 |
| 2005/0060538 A1* | 3/2005 | Beverly | 713/160 |
| 2005/0144300 A1 | 6/2005 | Craft et al. | |
| 2006/0133386 A1 | 6/2006 | McCormack et al. | |
| 2006/0248208 A1 | 11/2006 | Walbeck et al. | |
| 2007/0083682 A1 | 4/2007 | Bartley et al. | |
| 2007/0140240 A1 | 6/2007 | Dally et al. | |
| 2008/0043732 A1 | 2/2008 | Desai et al. | |
| 2008/0170501 A1 | 7/2008 | Patel et al. | |
| 2008/0209084 A1 | 8/2008 | Wang et al. | |
| 2008/0240111 A1 | 10/2008 | Gadelrab | |
| 2009/0063696 A1* | 3/2009 | Wang et al. | 709/232 |

FOREIGN PATENT DOCUMENTS

| | | |
|---|---|---|
| WO | WO 98/50852 | 11/1998 |
| WO | WO 99/04343 | 1/1999 |
| WO | WO 99/65219 | 12/1999 |
| WO | WO 00/13091 | 3/2000 |
| WO | WO 01/04770 | 1/2001 |
| WO | WO 01/05107 | 1/2001 |
| WO | WO 01/05116 | 1/2001 |
| WO | WO 01/05123 | 1/2001 |
| WO | WO 01/40960 | 6/2001 |
| WO | WO 01/59966 | 8/2001 |
| WO | WO 01/86430 | 11/2001 |
| WO | WO 2007/130476 | 11/2007 |

OTHER PUBLICATIONS

Zilog product Brief entitled "Z85C30 CMOS SCC Serial Communication Controller", Zilog Inc., 3 pages, 1997.

Internet pages of Xpoint Technologies, Inc. entitled "Smart LAN Work Requests", 5 pages, printed Dec. 19, 1997.

Internet pages entitled: Asante and 100BASE-T Fast Ethernet. 7 pages, printed May 27, 1997.

Internet pages entitled: A Guide to the Paragon XP/S-A7 Supercomputer at Indiana University. 13 pages, printed Dec. 21, 1998.

Richard Stevens, "TCP/IP Illustrated, vol. 1, The Protocols", pp. 325-326 (1994).

Internet pages entitled: Northridge/Southbridge vs. Intel Hub Architecture, 4 pages, printed Feb. 19, 2001.

Gigabit Ethernet Technical Brief, Achieving End-to-End Performance. Alteon Networks, Inc., First Edition, Sep. 1996, 15 pages.
Internet pages directed to Technical Brief on Alteon Ethernet Gigabit NIC technology, www.alteon.com, 14 pages, printed Mar. 15, 1997.
VIA Technologies, Inc. article entitled "VT8501 Apollo MVP4", pp. i-iv, 1-11, cover and copyright page, revision 1.3, Feb. 1, 2000.
iReady News Archives article entitled "iReady Rounding Out Management Team with Two Key Executives", http://www.ireadyco.com/archives/keyexec.html, 2 pages, printed Nov. 28, 1998.
"Toshiba Delivers First Chips to Make Consumer Devices Internet-Ready Based on iReady's Design," Press Release Oct. 1998, 3 pages, printed Nov. 28, 1998.
Internet pages from iReady Products, web sitehttp://www.ireadyco.com/products,html, 2 pages, downloaded Nov. 25, 1998.
iReady News Archives, Toshiba, iReady shipping Internet chip, 1 page, printed Nov. 25, 1998.
Interprophet article entitled "Technology", http://www.interprophet.com/technology.html, 17 pages, printed Mar. 1, 2000.
iReady Corporation, article entitled "The I-1000 Internet Tuner", 2 pages, date unknown.
iReady article entitled "About Us Introduction", Internet pages fromhttp://www.iReadyco.com/about.html, 3 pages, printed Nov. 25, 1998.
iReady News Archive article entitled "Revolutionary Approach to Consumer Electronics Internet Connectivity Funded", San Jose, CA, Nov. 20, 1997. 2 pages, printed Nov. 2, 1998.
iReady News Archive article entitled "Seiko Instruments Inc. (SII) Introduces World'S First Internet-Ready Intelligent LCD Modules Based on iReady Technology," Santa Clara, CA and Chiba, Japan, Oct. 26, 1998. 2 pages, printed Nov. 2, 1998.
NEWSwatch article entitled "iReady internet Tuner to Web Enable Devices", Tuesday, Nov. 5, 1996, printed Nov. 2, 1998, 2 pages.
EETimes article entitled "Tuner for Toshiba, Toshiba Taps iReady for Internet Tuner", by David Lammers, 2 pages, printed Nov. 2, 1998.
"Comparison of Novell Netware and TCP/IP Protocol Architectures", by J.S. Carbone, 19 pages, printed Apr. 10, 1998.
Adaptec article entitled "AEA-7110C-a DuraSAN product", 11 pages, printed Oct. 1, 2001.
iSCSI HBA article entitled "iSCSI and 2Gigabit fibre Channel Host Bus Adapters from Emulex, QLogic, Adaptec, JNI", 8 pages, printed Oct. 1, 2001.
iSCSI HBA article entitled "FCE-3210/6410 32 and 64-bit PCI-to-Fibre Channel HBA", 6 pages, printed Oct. 1, 2001.
ISCSI.com article entitled "iSCSI Storage", 2 pages, printed Oct. 1, 2001.
"Two-Way TCP Traffic Over Rate Controlled Channels: Effects and Analysis", by Kalampoukas et al., IEEE Transactions on Networking, vol. 6, No. 6, Dec. 1998, 17 pages.
IReady News article entitled "Toshiba Delivers First Chips to Make Consumer Devices Internet-Ready Based on iReady Design", Santa Clara, CA, and Tokyo, Japan, Oct. 14, 1998, printed Nov. 2, 1998, 3 pages.
Internet pages of InterProphet entitled "Frequently Asked Questions", by Lynne Jolitz, printed Jun. 14, 2000, 4 pages.
"File System Design for an NFS File Server Appliance", Article by D. Hitz, et al., 13 pages.
Adaptec Press Release article entitled "Adaptec Announces EtherStorage Technology", 2 pages, May 4, 2000, printed Jun. 14, 2000.
Adaptec article entitled "EtherStorage Frequently Asked Questions", 5 pages, printed Jul. 19, 2000.
Adaptec article entitled "EtherStorage White Paper", 7 pages, printed Jul. 19, 2000.
CIBC World Markets article entitled "Computers; Storage", by J. Berlino et al., 9 pages, dated Aug. 7, 2000.
Merrill Lynch article entitled "Storage Futures", by S. Milunovich, 22 pages, dated May 10, 2000.
CBS Market Watch article entitled "Montreal Start-Up Battles Data Storage Botttleneck", by S. Taylor, dated Mar. 5, 2000, 2 pages, printed Mar. 7, 2000.
Internet-draft article entitled "SCSI/TCP (SCSI over TCP)", by J. Satran et al., 38 pages, dated Feb. 2000, printed May 19, 2000.
Internet pages entitled Technical White Paper-Xpoint's Disk to LAN Acceleration Solution for Windows NT Server, printed Jun. 5, 1997, 15 pages.
Jato Technologies article entitled Network Accelerator Chip Architecture, twelve-slide presentation, printed Aug. 19, 1998, 13 pages.
EETimes article entitled Enterprise System Uses Flexible Spec, dated Aug. 10, 1998, printed Nov. 10, 1998, 3 pages.
Internet pages entitled "Smart Ethernet Network Interface Cards", which Berend Ozceri is developing, printed Nov. 25, 1998, 2 pages.
Internet pages of Xaqti corporation entitled "GigaPower Protocol Processor Product Review," printed Nov. 25, 1999, 4 pages.
U.S. Appl. No. 60/283,896, Titled: CRC Calculations for Out of Order PUDs, Filed Apr. 12, 2003, Inventor: Amit Oren, Assignee: Siliquent Technologies Ltd.
Internet pages entitled "DART: Fast Application Level Networking via Data-Copy Avoidance," by Robert J. Walsh, printed Jun. 3, 1999, 25 pages.
Andrew S. Tanenbaum, Computer Networks, Third Edition, 1996; ISBN 0-13-349945-6.
Rice University article entitled "LRP: A Network Subsystem Architecture for Server Systems", by P. Druschel and G. Banga, 14 pages.
Internet RFC/STD/FYI/BCP Archives article with heading "RFC2140" entitled "TCP Control Block Interdependence", web address http://www.faqs.org/ftp/rfc/pdf/rfc2140.txt.pdf, 11 pages, Apr. 1997.
WindRiver article entitled "Tornado: For Intelligent Network Acceleration", copyright Wind River Systems, 2001, 2 pages.
WindRiver White Paper entitled "Complete TCP/IP Offload for High-Speed Ethernet Networks", Copyright Wind River Systems, 2002, 7 pages.
Intel article entitled "Solving Server Bottlenecks with Intel Server Adapters", Copyright Intel Corporation, 1999, 8 pages.
Schwaderer et al., IEEE Computer Society Press publication entitled, "XTP in VLSI Protocol Decomposition for ASIC Implementation", from $15^{th}$ Conference on Local Computer Networks, 5 pages, Sep. 30-Oct. 3, 1990.
Beach, Bob, IEEE Computer Society Press publication entitled, "UltraNet: An Architecture for Gigabit Networking", from $15^{th}$ Conference on Local Computer Networks, 18 pages, Sep. 30-Oct. 3, 1990.
Chesson et al., IEEE Syposium Record entitled, "The Protocol Engine Chipset", from Hot Chips III, 16 pages, Aug. 26-27, 1991.
Maclean et al., IEEE Global Telecommunications Conference, Globecom '91, presentation entitled, "An Outboard Processor for High Performance Implementation of Transport Layer Protocols", 7 pages, Dec. 2-5, 1991.
Ross et al., IEEE article entitled "FX1000: A high performance single chip Gigabit Ethernet NIC", from Compcon '97 Proceedings, 7 pages, Feb. 23-26, 1997.
Strayer et al., "Ch. 9: The Protocol Engine" from XTP: The Transfer Protocol, 12 pages, Jul. 1992.
Publication entitled "Protocol Engine Handbook", 44 pages, Oct. 1990.
Koufopavlou et al., IEEE Global Telecommunications Conference, Globecom '92, presentation entitled, "Parallel TCP for High Performance Communication Subsystems", 7 pages, Dec. 6-9, 1992.
Lilienkamp et al., Publication entitled "Proposed Host-Front End Protocol", 56 pages, Dec. 1984.
Thia, Y.H. Publication entitled A Reduced Operational Protocol Engine (ROPE) for a multiple-layer bypass architecture, 16 pages.
U.S. Appl. No. 60/053,240, Titled: TCP/IP Network Accelerator and Method of Use, filed Jul. 18, 1997, Inventors: Jolitz et al., Assignee: InterProphet LLC.
Thia, Y.H. Publication entitled "High-Speed OSI Protocol Bypass Algorithm with Window Flow Control", pp. 53-68, Apr. 16, 1992.
Form 10-K for Exelan, Inc., for the fiscal year ending Dec. 31, 1987 (10 pages).
Form 10-K for Exelan, Inc., for the fiscal year ending Dec. 31, 1988 (10 pages).
Starr, David D. et al. "Intelligent Network Storage Interface Device." U.S. Appl. No. 09/675,700, filed Sep. 29, 2000.

Boucher, Laurence B. et al. "Intelligent Network Interface System and Method for Accelerated Protocol Processing." U.S. Appl. No. 09/692,561, filed Oct. 18, 2000.

Starr, Daryl D.. et al. "Intelligient Network Storage Interface System." U.S. Appl. No. 10/261,051, filed Sep. 30, 2002.

Merritt, Rick. "Ethernet Interconnect Outpacing Infiniband at Intel." EE Times article. Sep. 11, 2002. 9 pages.

Craft, Peter K. et al. "TCP Offload Device that Batches Session Layer Headers to Reduce Interrupts as Well as CPU Copies." U.S. Appl. No. 12/504,021, filed Oct. 19, 2009.

Craft, Peter K. et al. "TCP Offload Send Optimization." U.S. Appl. No. 12/504,021, filed Jul. 16, 2009.

Philbrick, Clive M. et al. "Freeing Transmit Memory on a Network Interface Device Prior to Receiving an Acknowledgment That Transmit Data Has Been Received by a Remote Device." U.S. Appl. No. 12/470,980, filed May 22, 2009.

Starr, Daryl D. et al. "Accelerating Data Transfer in a Virtual Computer System with Tightly Coupled TCP Connections." U.S. Appl. No. 12/410,366, filed Mar. 24, 2009.

Boucher, Laurence B. et al. "Obtaining a Destination Address So That a Network Interface Device Can Write Network Data Without Headers Directly Into Host Memory." U.S. Appl. No. 12/325,941, filed Dec. 1, 2008.

Boucher, Laurence B. et al. "Enabling an Enhanced Function of an Electronic Device." U.S. Appl. No. 11/985,948, filed Nov. 19, 2007.

Starr, Daryl D. et al. "Network Interface Device With 10 Gb/s Full-Duplex Transfer Rate." U.S. Appl. No. 11/799,720, filed May 1, 2007.

Craft, Peter K. et al. "Peripheral Device That DMAS The Same Data to Different Locations in a Computer." U.S. Appl. No. 11/788,719, filed Apr. 19, 2007.

Boucher, Laurence B. et al. "TCP/IP Offload Network Interface Device." U.S. Appl. No. 11/701,705, filed Feb. 2, 2007.

Starr, Daryl D. et al. "TCP/IP Offload Device With Reduced Sequential Processing." U.S. Appl. No. 11/348,810, filed Feb. 6, 2006.

Craft, Peter K. et al. "Transferring Control of TCP Connections Between Hierarchy of Processing Mechanisms." U.S. Appl. No. 11/249,006, filed Oct. 11, 2005.

Boucher, Laurence B. et al. "Network Interface Device That Can Transfer Control of a TCP Connection to a Host CPU." U.S. Appl. No. 11/029,863, filed Jan. 4, 2005.

Craft, Peter K. et al. "Protocol Stack That Offloads a TCP Connection From a Host Computer to a Network Interface Device." U.S. Appl. No. 11/027,842, filed Dec. 30, 2004.

Craft, Peter K. et al. "Protocol Stack That Offloads a TCP Connection From a Host Computer to a Network Interface Device." U.S. Appl. No. 11/016,642, filed Dec. 16, 2004.

Boucher, Laurence B. et al. "Method and Apparatus for Dynamic Packet Batching With a High Performance Network Interface." U.S. Appl. No. 10/678,336, filed Oct. 3, 2003.

Philbrick Clive M. et al. "Method and Apparatus for Data Re-Assembly With a High Performance Network Interface." U.S. Appl. No. 10/634,062, filed Aug. 4, 2003.

Boucher, Laurence B. et al. "High Network Interface Device and System for Accelerated Communication." U.S. Appl. No. 10/601,237, filed Jun. 19, 2003.

Boucher, Laurence B. et al. "Method and Apparatus for Distributing Network Traffic Processing on a Multiprocessor Computer." U.S. Appl. No. 10/438,719, filed May 14, 2003.

Boucher, Laurence B. et al. "Parsing a Packet Header." U.S. Appl. No. 10/277,604, filed Oct. 18, 2002.

Chandranmenon, Girish P. "Trading Packet Headers for Packet Processing." IEEE/ACM Transaction on Networking. vol. 4, No. 2. Apr. 1996. pp. 141-152.

* cited by examiner

TRANSFERRING CONTROL OF TCP CONNECTIONS BETWEEN HIERARCHY OF PROCESSING MECHANISMS

CROSS-REFERENCE TO RELATED APPLICATIONS

The present application claims the benefit under 35 U.S.C. §119 of U.S. Provisional Patent Application Ser. No. 60/617,384, filed by the present inventors on Oct. 8, 2004, which is incorporated by reference herein.

BACKGROUND

Traditional network protocol processing was software and CPU intensive, as multiple protocol layers needed to be processed in multiple CPU cycles for each packet that was sent or received over a network. Because of the variety of networks, networking protocols, routers, interface devices, computer operating systems and applications, it appeared necessary that such CPU intensive protocol processing was required. In addition to processing multiple protocol layers for each network packet, popular protocols such as TCP required further processing, including establishing and maintaining a TCP connection in order to ensure reliable communication, with the state of the TCP connection represented by a complicated block of information.

Such CPU intensive protocol processing became a bottleneck, because even as CPU speeds advanced dramatically, the faster CPUs could not keep up with increases in network speeds and traffic that caused increases in CPU protocol processing. Alacritech, Inc. solved this dilemma by splitting protocol processing tasks into repetitive data packet processing, which could be quickly and efficiently processed by specialized protocol processing hardware, and more complicated tasks that benefited from a CPU running a protocol stack. In addition, for protocols such as TCP, Alacritech, Inc. developed means for transferring control of connections such as TCP connections between a CPU running a protocol processing stack and protocol processing hardware for repetitive data packet processing.

Disclosure of these inventions can be found in various Alacritech patents and applications, including U.S. Patent Application No. 60/061,809, filed Oct. 14, 1997; U.S. Pat. No. 6,226,680, filed Apr. 27, 1998, issued May 1, 2001; U.S. Patent Application No. 60/098,296, filed Aug. 27, 1998; U.S. Pat. No. 6,389,479, filed Aug. 28, 1998, issued May 14, 2002; U.S. Pat. No. 6,434,620, filed Aug. 27, 1999, issued Aug. 13, 2002; U.S. Pat. No. 6,470,415, filed Oct. 13, 1999, issued Jan. 29, 2002; U.S. Pat. No. 6,247,060, filed Nov. 12, 1999, issued Jun. 12, 2001; U.S. Pat. No. 6,427,173, filed Dec. 15, 1999, issued Jul. 30, 2002; U.S. Pat. No. 6,427,171, filed Feb. 28, 2000, issued Jul. 30, 2002; U.S. patent application Ser. No. 09/675,484, filed Sep. 29, 2000; U.S. patent application Ser. No. 09/675,700, filed Sep. 29, 2000; U.S. patent application Ser. No. 09/692,561, filed Oct. 18, 2000; U.S. Pat. No. 6,334,153, filed Dec. 26, 2000, issued Dec. 25, 2001; U.S. Pat. No. 6,757,746, filed Feb. 20, 2001, issued Jun. 29, 2004; U.S. Pat. No. 6,687,758, filed Mar. 7, 2001, issued Feb. 3, 2004; U.S. patent application Ser. No. 09/802,551, filed Mar. 9, 2001; U.S. Pat. No. 6,658,480, filed Mar. 9, 2001, issued Dec. 2, 2003; U.S. Pat. No. 6,393,487, filed Mar. 12, 2001, issued May 21, 2002; U.S. patent application Ser. No. 09/855,979, filed May 14, 2001; U.S. patent application Ser. No. 09/970,124, filed Oct. 2, 2001; U.S. patent application Ser. No. 10/005,536, filed Nov. 7, 2001; U.S. patent application Ser. No. 10/023,240, filed Dec. 15, 2001; U.S. patent application Ser. No. 10/085,802, filed Feb. 26, 2002; U.S. patent application Ser. No. 10/093,042, filed Mar. 6, 2002; U.S. Pat. No. 6,591,302, filed Mar. 6, 2002, issued Jul. 8, 2003; U.S. patent application Ser. No. 10/098,694, filed Mar. 12, 2002; U.S. Patent Application No. 60/374,788, filed Apr. 22, 2002; U.S. Pat. No. 6,697,868, filed Jul. 29, 2002, issued Feb. 24, 2004; U.S. patent application Ser. No. 10/229,564, filed Aug. 27, 2002; U.S. patent application Ser. No. 10/246,820, filed Sep. 17, 2002; U.S. patent application Ser. No. 10/260,878, filed Sep. 27, 2002; U.S. patent application Ser. No. 10/260,959, filed Sep. 27, 2002; U.S. patent application Ser. No. 10/260,112, filed Sep. 27, 2002; U.S. patent application Ser. No. 10/261,051, filed Sep. 30, 2002; U.S. patent application Ser. No. 10/277,604, filed Oct. 18, 2002; U.S. patent application Ser. No. 10/289,977, filed Nov. 6, 2002; U.S. patent application Ser. No. 10/367,147, filed Feb. 12, 2003; U.S. patent application Ser. No. 10/369,902, filed Feb. 19, 2003; U.S. patent application Ser. No. 10/413,256, filed Apr. 14, 2003; U.S. patent application Ser. No. 10/420,364, filed Apr. 22, 2003; U.S. patent application Ser. No. 10/427,862, filed Apr. 30, 2003; U.S. patent application Ser. No. 10/438,719, filed May 14, 2003; U.S. patent application Ser. No. 10/601,237, filed Jun. 19, 2003; U.S. patent application Ser. No. 10/634,062, filed Aug. 4, 2003; U.S. patent application Ser. No. 10/639,810, filed Aug. 11, 2003; U.S. patent application Ser. No. 10/678,336, filed Oct. 3, 2003; U.S. patent application Ser. No. 10/706,398, filed Nov. 12, 2003; U.S. patent application Ser. No. 10/724,588, filed Nov. 28, 2003; U.S. patent application Ser. No. 10/729,111, filed Dec. 5, 2003; and U.S. patent application Ser. No. 10/881,271, filed Jun. 29, 2004. All of the above-referenced patents and applications are hereby incorporated by reference herein.

SUMMARY

The present inventors realized that network protocol processing could benefit from systems and methods that subdivide protocol processing such as TCP processing into several units, between which control of a TCP connection can be transferred, with the processing being performed by the unit that controls TCP connection.

In one embodiment, a system for communicating over a network is disclosed, the system comprising: a processor running a protocol processing stack to control a TCP connection; a first offload engine that receives control of the TCP connection from the stack to perform a first task corresponding to the TCP connection; and a second offload engine that receives control of the TCP connection from the first offload engine to perform a second task corresponding to the TCP connection. For example, the first offload engine can be protocol software such as an intermediate driver that can handle tasks such as teaming and/or reassembly of out-of-order data segments. As another example, the second offload engine can be a network interface card that provides hardware that accelerates data transfer.

In one embodiment, a system for communicating over a network is disclosed, the system comprising: a first processing mechanism that establishes a TCP connection; a second processing mechanism that receives control of the TCP connection from the first processing mechanism and performs a first task corresponding to the TCP connection; and a third processing mechanism that receives control of the TCP connection from the second processing mechanism and performs a third task corresponding to the TCP connection. For example, the first processing mechanism can be a CPU running a protocol processing stack, the second processing mechanism can be software such as an intermediate driver running on a processor, and the third processing mechanism can be a network interface card.

In one embodiment, a method for communicating over a network is disclosed, the method comprising: performing, by a first processing mechanism, a first task that corresponds to a TCP connection; transferring control of the TCP connection from the first processing mechanism to a second processing mechanism; performing, by the second processing mechanism, a second task that corresponds to the TCP connection; transferring control of the TCP connection from the second processing mechanism to a third processing mechanism; and performing, by the third processing mechanism, a third task that corresponds to the TCP connection. For example, the first task can include establishing or terminating the TCP connection, the second task can include reassembling out-of-order data segments for the TCP connection or switching a network port for the TCP connection from a first port to a second port, and the third task can include receive processing of packets corresponding to the TCP connection, prepending headers to data segments for the TCP connection, or parsing received packet headers corresponding to the TCP connection.

DETAILED DESCRIPTION

Figure 1:
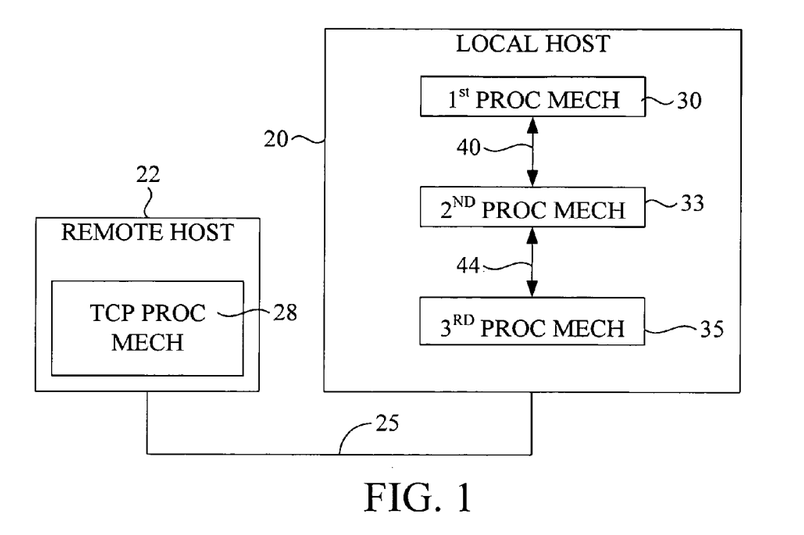
FIG. 1 is a schematic view of local host having a system for communicating over a network with a remote host.

FIG. 1 shows a schematic view of a local host 20 that can communicate with a remote host 22 via a network 25. The network 25 in this embodiment can operate in accordance with Ethernet or related protocols, such as Fast-Ethernet, Gigabit-Ethernet or 10-Gigabit-Ethernet, and is designed to carry information packets (sometimes called frames) that can be directed over the network by nodes such as routers in accordance with networking protocols such as Internet Protocol (IP). The local host 20 and the remote host 22 can also be considered to be nodes on the network 25, but hosts 20 and 22 are distinguished from routers by their ability to process higher level protocols such as Transport Layer Protocol (TCP) and User Datagram Protocol (UDP) on behalf of applications running on the hosts. For example, the remote host 22 in this embodiment includes transport layer processing capabilities such as a TCP processing mechanism 28. The TCP protocol provides error-free delivery of data between the network hosts, in part by establishing a TCP connection on each of the hosts that governs that data delivery, the TCP connection implementing multiple rules and maintaining status information regarding the data delivery and other variables to transfer the data between specified applications on the hosts. Local host 20 and remote host 22 each also include many other conventional elements which are not shown, such as a CPU and memory.

The local host 20 includes first processing mechanism 30, second processing mechanism 33, and third processing mechanism 35, each of which can control a TCP connection. Controlling a TCP connection includes owning a block of memory that describes the current state of the TCP connection. Control of a TCP connection can be passed between the first processing mechanism 30 and the second processing mechanism 33, as shown by arrow 40. Control of the TCP connection can also be passed between the second processing mechanism 33 and the third processing mechanism 35, as shown by arrow 44. Moreover, control of the TCP connection may optionally be passed between the first processing mechanism 30 and the third processing mechanism 35, without the second processing mechanism 33 ever acquiring control of the connection. The second processing mechanism 33 may sometimes be called a first offload engine, and the third processing mechanism 35 may sometimes be called a second offload engine.

In one embodiment, the third processing mechanism 35 can perform a task or set of tasks that is a subset of the tasks that can be performed by the second processing mechanism 33 or the first processing mechanism, and the second processing mechanism 33 can perform a set of tasks that is a subset of the tasks that can be performed by the first processing mechanism 30. As an example, the third processing mechanism 35 can perform a task or set of tasks that is a subset of the tasks that can be performed by the second processing mechanism 33, and the second processing mechanism 33 can perform a set of tasks that is a subset of the tasks that can be performed by the first processing mechanism 30. Alternatively, one or all of the task or set of tasks performed by the third processing mechanism 35 may not be a task or set of tasks performed by the second processing mechanism 33 or the first processing mechanism. Similarly, one or all of the task or tasks performed by the second processing mechanism 35 may not be a task or set of tasks performed by the third processing mechanism 33 or the first processing mechanism.

Figure 2:
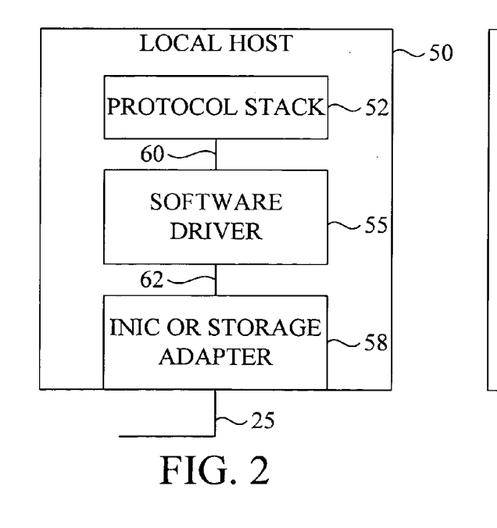
FIG. 2 is a schematic view of local host that can transfer control of a TCP connection between a protocol stack, a software driver and a network interface card or storage adapter.

For example, as shown in FIG. 2, the first processing mechanism 30 can be a CPU running a protocol processing stack 52 that can establish and terminate network connections such as TCP connections, handle error conditions and data reassembly for packets received out-of-order from a network, process received packets to place data from the packets in a destination such as a file cache and encapsulate data in network packets to transmit the data from local host 50 to a remote host. The second processing mechanism 33 in this example may be a software driver 55 that handles data reassembly for out-of-order received packets, and manages switching network ports for the connection, which may be known as teaming, trunking, failover or port aggregation. The third processing mechanism 35 in this example may be an intelligent network interface card (INIC) 58 or storage adapter that is coupled to the CPU by a host bus such as an input/output bus, the INIC including protocol processing hardware, software and/or firmware that is configured for straightforward processing of network packets, but which does not by itself establish and terminate TCP connections or handle error conditions. For example, the INIC may be able to process TCP and IP checksums and analyze received packet headers in hardware, place the data from received packets in an appropriate memory location of the host 20 and segment and encapsulate transmit data for transmission over the network.

For instance, control of a TCP connection may be transferred between protocol stack 52 and software driver 55 as a block of memory across a first host bus 60 such as a memory bus, or a block of memory representing the current state of the TCP connection can be remapped between a protocol stack domain and a software driver domain, or an ownership bit can be flipped to transfer ownership of the memory representing the TCP connection. Similarly, control of a TCP connection may be transferred between protocol stack 52 or software driver 55 and INIC 58 as a block of memory across a second host bus 60 such as a input/output bus, for example a PCI bus. Details of methods for handing out or offloading a TCP connection can be found in various Alacritech patents and applications referenced above. As one example, a first signal can be sent from the software driver 55 to the INIC 58, the first signal indicating an intention to transfer control of the TCP connection from the software driver to the INIC; with the INIC responding to the first signal by sending a second signal to the software driver, the second signal indicating that the INIC is able to receive control of the TCP connection; followed by sending a third signal from the software driver to the INIC, the third signal responsive to the second signal and transferring control of the TCP connection from the software driver to the INIC.

Figure 3:
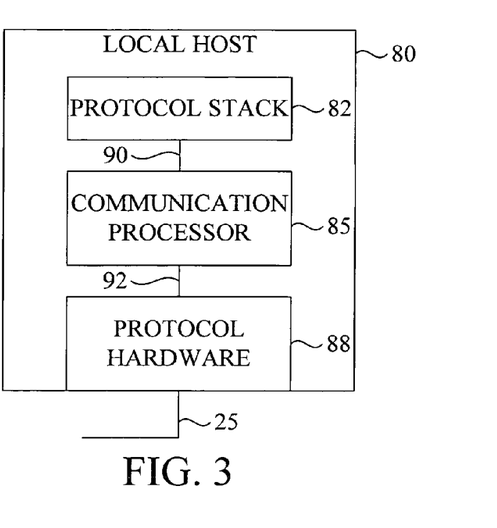
FIG. 3 is a schematic view of local host that can transfer control of a TCP connection between a protocol stack, a communication processor and protocol processing hardware.

Alternatively, as shown in FIG. 3, the first processing mechanism 30 can be a central processing unit (CPU) running a protocol processing stack 82 that can establish and terminate network connections such as TCP connections, handle error conditions and data reassembly for out-of-order packets, and process network packets to place data from the packets in a destination such as a file cache and encapsulate data in network packets to transmit the data from local host 80 to a remote host. The second processing mechanism 33 in this example may be a communication processor 85 on an adapter such as an INIC or storage adapter that is coupled to the CPU by a host bus such as an input/output bus 90, the processor 85 running a TCP/IP stack that has most of the capabilities of the protocol processing stack 82, but which does not establish or terminate TCP connections for local host 80. The third processing mechanism 35 in this example may be protocol processing hardware 88, software and/or firmware on the INIC or storage adapter that is coupled to the communication processor 85 by host bus 92, and is configured for straightforward processing of network packets, but which cannot by itself establish and terminate TCP connections or handle error conditions. For example, the protocol hardware 88 may be able to place the data from received packets in an appropriate memory location of the host 90 and to segment and encapsulate transmit data for transmission over the network.

In this example, the protocol stack 82 may establish a TCP connection for host 80, after which the connection can be handed out (sometimes called offloaded) to the communication processor 85. The communication processor 88 can then handle the TCP connection, including transferring data corresponding to the connection to and from host memory, handling errors and reassembling out-of-order TCP packets. Once the TCP connection is stable, the communication processor 85 can transfer control of the connection to the protocol hardware 88, which in this example is specialized to provide accelerated data path processing of network packets corresponding to the TCP connection. Should an exception condition occur while the protocol processing hardware 85 is processing data corresponding to the TCP connection, control of the connection can be flushed (sometimes called uploading the connection) back to the communication processor 85. For example, data from out-of-order received packets may be reassembled by the communication processor 85. Should another exception condition occur while the communication processor 88 is controlling the connection, such as receipt of a packet indicating the session is to be terminated, the communication processor 88 can upload or flush the connection to the protocol stack 82.

Figure 4:
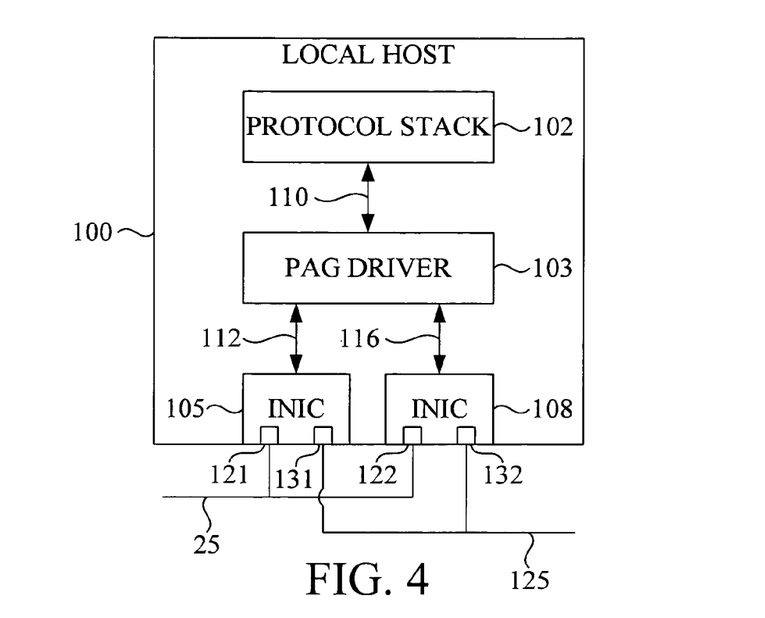
FIG. 4 is a schematic view of local host that can transfer control of a TCP connection between a protocol stack, a port aggregation driver and plural network interface ports.

FIG. 4 shows another example of a local host 100 for which a first processing mechanism may be a CPU running a protocol processing stack 102 that can establish and terminate network connections such as TCP connections, handle error conditions and data reassembly for out-of-order packets, and process network packets to receive and transmit data in the packets, although the first processing mechanism may do more or less than this. A second processing mechanism in this example may be a port aggregation (PAG) driver 103 that manages logical connections such as TCP connections for a plurality of network ports and which can, for example, switch the network ports that are utilized by such connections. An example of a port aggregation driver can be found in Alacritech's U.S. patent application Ser. No. 10/229,564, filed Aug. 22, 2002, entitled TCP Offload Device That Load Balances And Fails-Over Between Aggregated Ports Having Different MAC Addresses. A third processing mechanism in this example may be INIC 105 and/or INIC 108, each of which may have one or more of the network ports that provide interconnection with one or more networks. As an example, INIC 105 and INIC 108 may have essentially identical functionality and both contain hardware, software and/or firmware configured for straightforward processing of network packets, but do not in this example establish and terminate TCP connections or handle error conditions. For instance, INIC 105 may be able to place the data from received packets in an appropriate memory location of the host 100 and to segment and encapsulate transmit data for transmission over a network, including checksum calculation for both transmit and receive. A device driver may be included in the host 100 to communicate between protocol stack 102 and/or PAG driver 103 and the INICs 105 and 108. In this example, INIC 105 is connected to network 25 via port 121 and is connected to network 125 via port 131. Similarly, INIC 108 is connected to network 25 via port 122 and is connected to network 125 via port 132.

Should an error or other exception condition occur for a logical connection such as a TCP connection that is controlled by INIC 105, INIC 105 may flush (or upload) the connection to PAG driver 103, as shown by arrow 112. PAG driver 153 will then look at the exception condition to determine whether to upload (or flush) the TCP connection to protocol stack 102 as shown by arrow 110, or to hand the connection out to INIC 105 or INIC 108 as shown by arrow 112 or arrow 116, respectively. For example, should the exception condition be the receipt of a FIN packet for the connection from network 25, PAG driver 103 will upload (or flush) the TCP connection to protocol stack 102 as shown by arrow 110, and protocol stack 102 will use the FIN packet to terminate the connection. In one example, this upload (or flush) may be requested by the PAG driver 103, and the upload (or flush) can be handled by the protocol stack 102. On the other hand, should the exception condition be the receipt of a packet from a network switch indicating that the connection should be migrated from port 121 to another port that is connected to network 25, PAG driver 103 may handout the connection, as shown by arrow 116, to INIC 108, with instructions to use port 122 for that logical connection. Should the exception condition be the receipt of a packet from a network switch indicating that the connection should be migrated from port 121 to a port that is connected to network 125, PAG driver 103 may choose whether to handout the logical connection to INIC 105, with instructions to use port 131 for that connection, or to INIC 108, with instructions to use port 132 for that connection.

Figure 5:
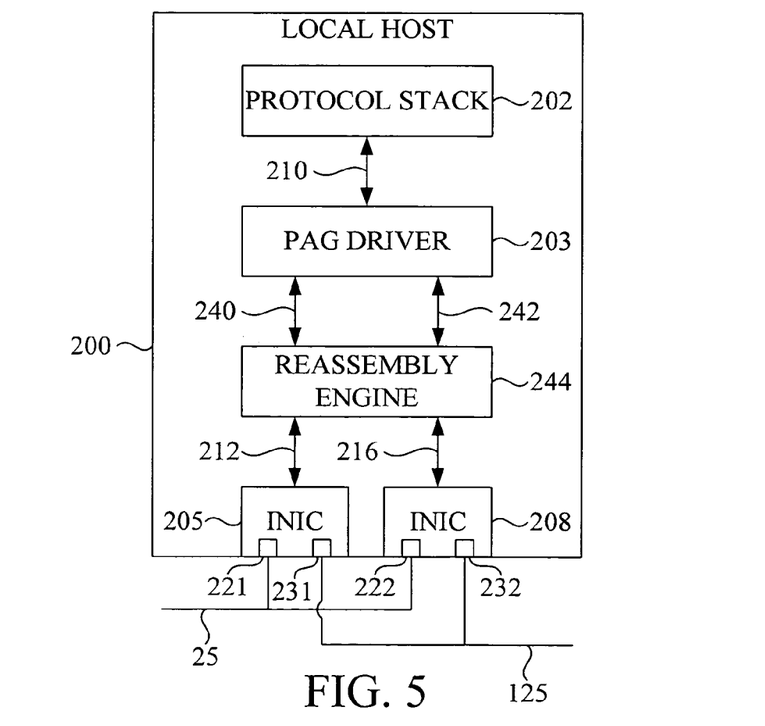
FIG. 5 is a schematic view of local host that can transfer control of a TCP connection between a protocol stack, a port aggregation driver, a reassembly engine and plural network interface ports.

FIG. 5 shows another example of a local host 200 for which a first processing mechanism may be a CPU running a protocol processing stack 202 that can establish and terminate network connections such as TCP connections, handle error conditions and data reassembly for out-of-order packets, and process network packets to receive and transmit data in the packets, although the first processing mechanism may do more or less than this. A second processing mechanism in this example may be a port aggregation (PAG) driver 203 that manages logical connections such as TCP connections for a plurality of network ports and which can, for example, switch the network ports that are utilized by such connections. A third processing mechanism in this example may be a reassembly engine 244 that handles data reassembly for packets that were received out-of-order from a network. A fourth processing mechanism in this example may be INIC 205 and/or INIC 208, each of which may have one or more of the network ports that provide interconnection with one or more networks. As an example, INIC 205 and INIC 208 may have essentially identical functionality and both contain hardware, software and/or firmware configured for straightforward processing of network packets, but do not in this example establish and terminate TCP connections or handle error conditions. For instance, INIC 205 may be able to place the data from received packets in an appropriate memory location of the host 200 and to segment and encapsulate transmit data for transmission over a network, including checksum calculation for both transmit and receive. In this example, INIC 205 is connected to network 25 via port 221 and is connected to network 125 via port 231. Similarly, INIC 208 is connected to network 25 via port 222 and is connected to network 125 via port 232.

Should an error or other exception condition occur for a logical connection such as a TCP connection that is controlled by INIC 205, INIC 205 may flush (or upload) the connection to reassembly engine 244, as shown by arrow 212, which will determine whether the exception condition is simply the receipt of an out-of-order packet for the TCP connection, in which case the reassembly engine 244 will reassemble data from that connection. If the connection becomes stable and all packets corresponding to the connection are received in order the connection may be passed back or offloaded to INIC 205 for fast-path data processing. Should the exception condition involve something beside the receipt of an out-of-order packet, reassembly engine 244 may pass control of the connection to PAG driver 203, as shown by arrow 240. PAG driver 203 will then look at the exception condition to determine whether to upload (or flush) the TCP connection to protocol stack 202 as shown by arrow 210, or to hand the connection out (or offload) to INIC 205 or INIC 208, as shown by arrow 212 or arrow 216, respectively. Note that receipt of an out-of-order packet may also be a signal that a connection should be migrated to a different network port. For this reason there may be efficiencies in having a processing mechanism such as a driver that handles both port aggregation and reassembly of out-of-order packets.

As another example, should the exception condition be the receipt of a FIN packet for the connection from network 25, PAG driver 203 will upload (or flush) the TCP connection to protocol stack 202 as shown by arrow 210, and protocol stack 202 will use the FIN packet to terminate the connection. On the other hand, should the exception condition be the receipt of a packet from a network switch indicating that the connection should be migrated from port 221 to another port that is connected to network 25, PAG driver 203 may handout (or offload) the connection, as shown by arrow 216, to INIC 208, with instructions to use port 222 for that logical connection. Should the exception condition be the receipt of a packet from a network switch indicating that the connection should be migrated from port 221 to a port that is connected to network 125, PAG driver 203 may choose whether to handout (or offload) the logical connection to INIC 205, with instructions to use port 231 for that connection, or to INIC 208, with instructions to use port 232 for that connection.

Figure 6:
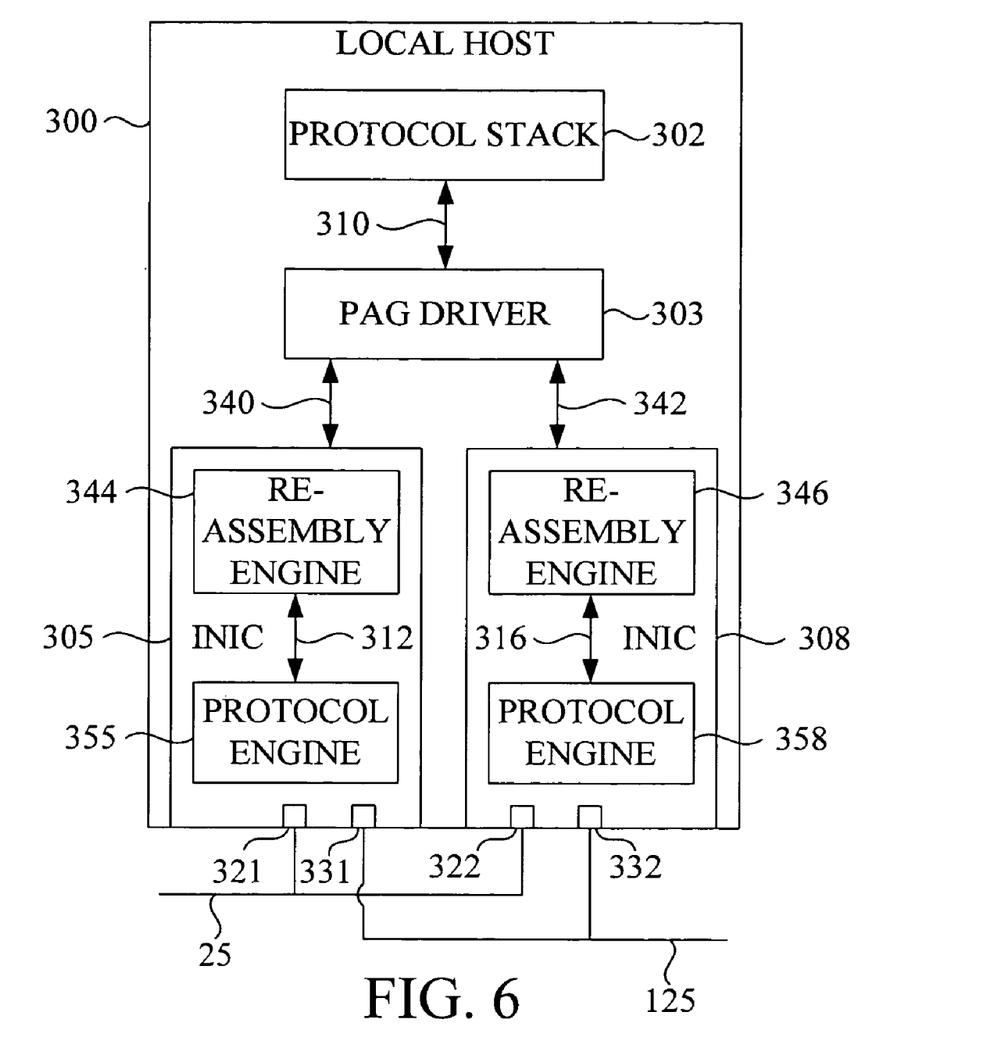
FIG. 6 is a schematic view of local host that can transfer control of a TCP connection between a protocol stack, a port aggregation driver, and reassembly engines and protocol engines contained in plural network interface devices.

FIG. 6 shows another example of a local host 300 for which a first processing mechanism may be a CPU running a protocol processing stack 302 that can establish and terminate network connections such as TCP connections, handle error conditions and data reassembly for out-of-order packets, and process network packets to receive and transmit data in the packets, although the first processing mechanism may do more or less than this. A second processing mechanism in this example may be a port aggregation (PAG) driver 303 that manages logical connections such as TCP connections for a plurality of network ports and which can, for example, switch the network ports that are utilized by such connections. A third processing mechanism in this example may be reassembly engines 344 and 346 contained in INICs 305 and 308, respectively. Reassembly engines 344 and 346 may be hardware, software or firmware that handles data reassembly for packets that were received out-of-order from a network. A fourth processing mechanism in this example may be protocol engine 355 and/or protocol engine 358, each of which may have essentially identical functionality and both of which contain hardware, software and/or firmware configured for straightforward processing of network packets, but do not in this example establish and terminate TCP connections or handle error conditions. For instance, INIC 305 may be able to place the data from received packets in an appropriate memory location of the host 300 and to segment and encapsulate transmit data for transmission over a network, including checksum calculation for both transmit and receive. In this example, INIC 305 is connected to network 25 via port 321 and is connected to network 125 via port 331. Similarly, INIC 308 is connected to network 25 via port 322 and is connected to network 125 via port 332.

Should an error or other exception condition occur for a logical connection such as a TCP connection that is controlled by INIC 305, INIC 305 may flush (or upload) the connection to reassembly engine 344, as shown by arrow 312, which will determine whether the exception condition is simply the receipt of an out-of-order packet for the TCP connection, in which case the reassembly engine 344 will reassemble data from that connection. If the connection becomes stable and all packets corresponding to the connection are received in order the connection may be passed back to INIC 305 for fast-path data processing. Should the exception condition involve something beside the receipt of an out-of-order packet, reassembly engine 344 may pass control of the connection to PAG driver 303, as shown by arrow 340. PAG driver 303 will then look at the exception condition to determine whether to upload (or flush) the TCP connection to protocol stack 302 as shown by arrow 310, or to hand the connection out (or offload) to INIC 305 or INIC 308, as shown by arrow 312 or arrow 316, respectively. For example, should the exception condition be the receipt of a FIN packet for the connection from network 25, PAG driver 303 will upload (or flush) the TCP connection to protocol stack 302 as shown by arrow 310, and protocol stack 302 will use the FIN packet to terminate the connection. On the other hand, should the exception condition be the receipt of a packet from a network switch indicating that the connection should be migrated from port 321 to another port that is connected to network 25, PAG driver 303 may handout (or offload) the connection, as shown by arrow 316, to INIC 308, with instructions to use port 322 for that logical connection. Should the exception condition be the receipt of a packet from a network switch indicating that the connection should be migrated from port 321 to a port that is connected to network 125, PAG driver 303 may choose whether to handout (or offload) the logical connection to INIC 308, with instructions to use port 331 for that connection, or to INIC 305, with instructions to use port 332 for that connection.

Appendix A provides a more detailed description of one example of a system and method including three processing mechanisms between which control of a TCP connection can be transferred, with the processing being performed by the unit that controls TCP connection. The example of Appendix A focuses on a software driver that can control a TCP connection to perform port aggregation for host having a protocol stack and at least one INIC, and which can transfer control of the TCP connection between the stack and the INIC. Although this application has focused on a few embodiments having various processing mechanisms between which control of a logical connection can be transferred, systems having additional connection-controlling processing mechanisms can be provided for enhanced functionality.

The invention claimed is:

1. A system for communicating over a network, the system comprising:
    a processor running a protocol processing stack to establish and control a Transmission Control Protocol TCP connection, the TCP connection having a state and being identified at least in part by an Internet Protocol (IP) address and TCP port of the host, and an IP address and TCP port of a remote host;
    a first offload engine that receives control of the TCP connection from the stack to perform a first task corresponding to the TCP connection; and
    a second offload engine that receives the TCP connection from the first offload engine to perform a second task corresponding to the TCP connection,
    wherein the first and second offload engines are part of the same host.

2. The system of claim 1, wherein the first offload engine cannot perform the second task.

3. The system of claim 1, wherein the second offload engine cannot perform the first task.

4. The system of claim 1, wherein the first task includes changing a network port for the TCP connection from a first network port to a second network port.

5. The system of claim 1, wherein the first task includes reassembly of out-of-order data for the TCP connection.

6. The system of claim 1, wherein the second task includes receive processing of packets corresponding to the TCP connection.

7. The system of claim 1, wherein the second task includes prepending headers to data segments for the TCP connection.

8. The system of claim 1, wherein the second task includes parsing received packet headers corresponding to the TCP connection.

9. A method for communicating over a network, the method comprising:
    establishing a Transmission Control Protocol (TCP) connection, the TCP connection having a state and being identified at least in part by an Internet Protocol (IP) address and TCP port of the host, and an IP address and TCP port of a remote host;
    performing, by a first processing mechanism, a first task that corresponds to a TCP connection;
    transferring control of the TCP connection from the first processing mechanism to a second processing mechanism;
    performing, by the second processing mechanism, a second task that corresponds to the TCP connection;
    transferring the TCP connection from the second processing mechanism to a third processing mechanism; and
    performing, by the third processing mechanism, a third task that corresponds to the TCP connection;
    wherein control of the TCP connection is held by the first, second or third processing mechanism that controls a block of memory representing the current state of the TCP connection, and the processing mechanisms are part of the same host.

10. The method of claim 9, wherein the first task includes establishing the TCP connection.

11. The method of claim 9, wherein the second task includes reassembling out-of-order data segments for the TCP connection.

12. The method of claim 9, wherein the third task includes reassembling out-of-order data segments for the TCP connection.

13. The method of claim 9, wherein the second task includes switching a network port for the TCP connection from a first port to a second port.

14. The method of claim 9, wherein the second task includes switching a network port for the TCP connection from a first network interface device to a second network interface device.

15. The method of claim 9, wherein the third task includes receive processing of packets corresponding to the TCP connection.

16. The method of claim 9, wherein the third task includes prepending headers to data segments for the TCP connection.

17. The method of claim 9, wherein the third task includes parsing received packet headers corresponding to the TCP connection.

18. The method of claim 9, further comprising transferring control of the TCP connection from the third processing mechanism to the second processing mechanism.

19. The method of claim 9, further comprising transferring control of the TCP connection from the second processing mechanism to the first processing mechanism.

20. A system for communicating over a network, the system comprising:
    a first processing mechanism that establishes a transmission control protocol (TCP) connection, the TCP connection having a state and being identified at least in part by an Internet Protocol (IP) address and TCP port of the host, and an IP address and TCP port of a remote host;
    a second processing mechanism that receives control of the TCP connection from the first processing mechanism and performs a first task corresponding to the TCP connection; and
    a third processing mechanism that receives the TCP connection from the second processing mechanism and performs a third task corresponding to the TCP connection;
    wherein control of the TCP connection is held by the first, second or third processing mechanism that controls a block of memory representing the current state of the TCP connection, and the processing mechanisms are part of the same host.

21. The system of claim 20, wherein the second processing mechanism includes software running on a processor.

22. The system of claim 20, wherein the third processing mechanism includes a network interface card.

23. The system of claim 20, wherein the second processing mechanism is separated from the third processing mechanism by an input/output bus.

24. The system of claim 20, wherein the first processing mechanism is separated from the second processing mechanism by an input/output bus.

25. The system of claim 20, wherein at least one of the second and third processing mechanisms is an offload engine.

26. The system of claim 20, wherein the second task includes port aggregation, and the third task does not include port aggregation.

27. The system of claim 20, wherein the second set of tasks includes reassembly of out-of-order segments, and the third set of tasks does not include reassembly of out-of-order segments.

28. The system of claim 20, wherein the first set of tasks includes establishment of the network connection.

* * * * *